(12) United States Patent
Bailey et al.

(10) Patent No.: US 7,289,534 B1
(45) Date of Patent: Oct. 30, 2007

(54) FACILITATING SUBSCRIBER SERVICES MANAGEMENT

(75) Inventors: Joshua Charles Bailey, Raleigh, NC (US); Alan Jay Marks, Raleigh, NC (US)

(73) Assignee: Alcatel Lucent, Paris (FR)

( * ) Notice: Subject to any disclaimer, the term of this patent is extended or adjusted under 35 U.S.C. 154(b) by 1120 days.

(21) Appl. No.: 10/189,965

(22) Filed: Jul. 5, 2002

(51) Int. Cl.
*H04J 3/16* (2006.01)
(52) U.S. Cl. .............. 370/468; 370/465; 370/401
(58) Field of Classification Search .......... 370/252, 370/254, 352, 356, 480, 493; 709/220, 223
See application file for complete search history.

(56) References Cited

U.S. PATENT DOCUMENTS 6,798,751 B1 * 9/2004 Voit et al. ............... 370/252

OTHER PUBLICATIONS

Metz, Christopher. AAA Protocols: Authentication, Authorization, and Accounting for the Internet. IEEE. Nov./Dec. 1999. pp. 75-79.*

* cited by examiner

*Primary Examiner*—Duc Ho (74) *Attorney, Agent, or Firm*—Raymond M. Galasso, P.C.; Nonny D. Slaton (57) ABSTRACT

One embodiment of the disclosures made herein is an apparatus capable of providing Digital Subscriber Line Access Multiplexing (DSLAM) functionality and coupled to a subscriber data processing system by a Digital Subscriber Line. In accordance with such an apparatus, the apparatus includes an Application Server Module (ASM), a Services Management Module (SMM) coupled to the ASM, a Services Selector Module (SSM) coupled to the SMM and a Resource Management System (RMS) coupled to the SMM. The ASM is capable of facilitating a subscriber service for a subscriber. The SMM enables at least one of managing operation functions of the ASM, managing system resources for enabling efficient operation of the ASM and enabling personalized services information to be delivered to the subscriber. The SSM is capable of presenting personalized services information to a subscriber data processing system and the SSM interfaces with the SMM for receiving services information from the SMM, thereby enabling the SSM to transmit personalized services information for reception of a data processing system accessible by the subscriber. The SMM interfaces with the RMS for affecting network resource parameters associated with operation of the ASM.

22 Claims, 5 Drawing Sheets

FACILITATING SUBSCRIBER SERVICES MANAGEMENT

FIELD OF THE DISCLOSURE

The disclosures made herein relate generally to Digital Subscriber Line Access Multiplexor (DSLAM) and more particularly to facilitating subscriber services management via an apparatus capable of providing DSLAM functionality.

BACKGROUND

Digital service subscribers are beginning to be offered various types of rich content over their Digital Subscriber Line (DSL) connections. Streamed videos, multicast videos, real-time communication, videoconferencing and network-based gaming applications are examples of such rich content. To support such rich content in a manner that is efficient and effective for both the subscriber and the service provider, a minimum level of service intelligence must be available to the service provider for enabling management of subscriber services. Examples of subscriber service management capabilities include real-time/dynamic analysis reporting, provisioning, bandwidth management and application management.

Service management capabilities enabled by service intelligence of conventional network elements are limited in its scope and abilities. For example, Internet Service Provider (ISP) points of presence (POPs) are a conventional network element capable of providing only limited service intelligence on their Internet Protocol (IP) backbone networks. A significant limitation of service intelligence in ISP IP backbone networks is that they do not involve any higher-layer awareness in associated DSLAM access networks. Such higher-layer awareness in associated DSLAM access networks is necessary to manage subscriber services all the way down the network to the end-user. Similarly, Service Selection Gateways (SSGs) that exist in some DSLAM applications are another conventional network element capable of providing only limited service intelligence. In fact, SSGs that exist presently in DSLAM applications are little more 'portal dashboards', providing no significant management of subscriber services.

Therefore, facilitating subscriber services management in a manner that overcomes the limitation associated with the conventional approaches is useful.

DETAILED DESCRIPTION OF THE DRAWING FIGURES

The disclosures made herein relate to facilitating subscriber services management via a Digital Subscriber Line Access Multiplexor (DSLAM). Examples of subscriber services management capabilities include analysis and reporting of connection bandwidth; active shaping and control of connection bandwidth; analysis and reporting of subscriber application usage; dynamic provisioning of subscriber services; and managing quality of service factors. By implementing such subscriber services management capabilities via a DSLAM, higher-layer services that are enabled locally by the capabilities of the DSLAM can be most effectively managed. For example, multicast video, real-time communications, videoconferencing, remote data storage, local file transfers and the like may be effectively and efficiently hosted via the DSLAM.

In accordance with embodiments of the disclosures made herein, a Services Management Module (SMM) is located within the DSLAM that facilitates the subscriber services management capabilities. The SMM facilitates the function of managing Application Server Modules (ASM) in the DSLAM, the function of interfacing with a Personalized Service Selector (PSS) for presenting services information to end-users and/or to ISP's wholesaling services facilitated by the ASM's and the function of interfacing with the access network management system in order to configure network resources based on subscriber service requirements of an application server module. The main advantage of the disclosed approach to facilitating subscriber services management capabilities is that it allows network access providers to have a management and control endpoint for services located in a DSLAM, thereby being directly linked to services delivered from that DSLAM. That is, services are DSLAM-hosted.

An advantage of providing ASM functionality from within the DSLAM is that a service provider can offer application services with little to no change in network architecture. The DSLAM is already present and functional in the network. The service provider only needs to add the ASM to the DSLAM and configure it within the DSLAM. This can be done much faster than qualifying a new box in a Telco network node. The bulk of the users would reside on the host DLSAM therefore eliminating major backhaul over the Telco network.

Figure 1:
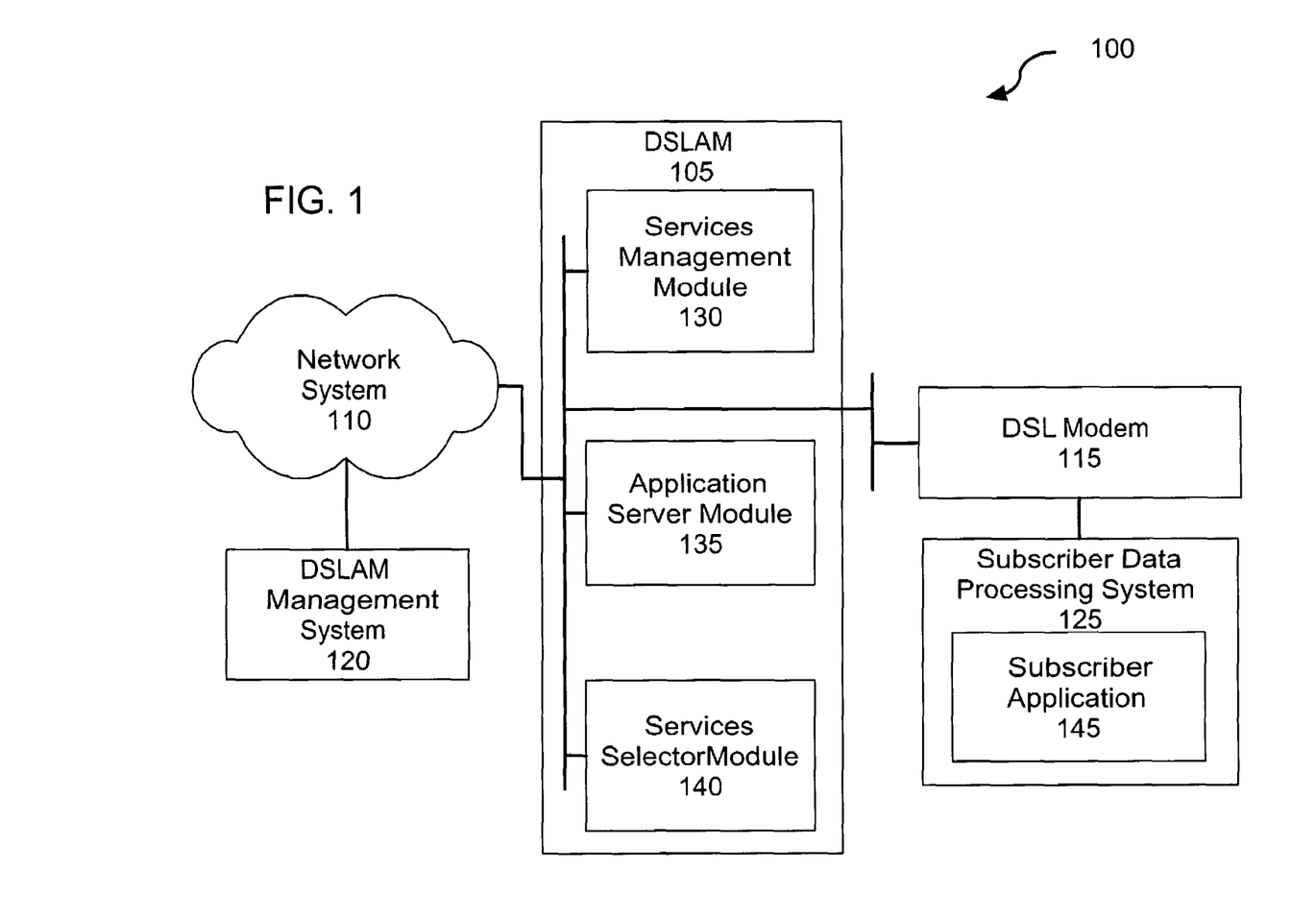
FIG. 1 is a block diagram view depicting an embodiment of a communication system in accordance with the disclosures made herein, wherein a DSLAM includes an Application server module, a services management module and a services selector module mounted and interconnected therein.

Turning now to the drawing figures, FIG. 1 depicts an embodiment of a communication system 100 in accordance with the disclosures made herein. The communication system includes a Digital Subscriber Line Access Multiplexor (DSLAM) 105 connected between a network system 110 and a Digital Subscriber Line (DSL) modem 115. An ATM network, an IP network and a combination thereof are examples of the network system 110. A DSLAM management system 120 (e.g., a suitably-equipped workstation) is connected to the network system 110. A Subscriber Data Processing System (SDPS), 125 is connected to the DSL modem 115. It is contemplated and disclosed herein that a communication network (broader than the network system 110) comprises all of the components (105-125) of the communication system 100 and their subcomponents.

The DSLAM 105 includes a Services Management Module (SMM) 130, an application server module (ASM) 135 and a Services Selector Module (SSM) 140. The DSL modem 115, the SMM 130, the ASM, 135 and the SSM 140 are each connected to a bus 145 for enabling communication therebetween. In one embodiment, the SMM 130, ASM 135 and SSM 140 are discrete cards that may share or may not share resources. In another embodiment, a single card comprises the SMM 130, ASM 135 and SSM 140. It is contemplated and disclosed herein that the SMM 130, ASM 135 and SSM 140 may share at least a portion of their resources. For example, memory and processors may be shared resources.

As depicted, the network system 110 and the DSL modem 115 are each connected to the bus 145. It will be appreciated and understood by one skilled in the art that additional components (not shown) may be interposed between certain components (105-135) of the communication system 100 for enabling their interconnection and interoperability. For example, one or more network interface device (not shown) may be connected between at least two of the network system 110, the DSL modem 115 and the SMM 130.

The ASM 135 is an example of a server application and is capable of facilitating a subscriber service for a subscriber (i.e. an available subscriber service). Examples of subscriber services include video services, gaming services and the like. The SMM 130 is capable of enabling at least one of managing operation functions of the ASM 135, managing system resources for enabling efficient operation of the ASM and enabling personalized services information to be delivered to the subscriber. The SSM 140 is capable of presenting personalized services information to a subscriber data processing system and the SSM 140 interfaces with the SMM 130 for receiving services information from the SMM 130. In this manner, the SSM 140 is able to transmit personalized services information for reception by a data processing system accessible by the subscriber. The DSLAM management system 120 is an example of a Resource Management System (RMS) capable of implementing modifications of network resource parameters. The SMM 130 interfaces with the DSLAM management system 120 for affecting (e.g., modifying) network resource parameters associated with operation of the ASM.

The SDPS 125 includes a subscriber application 145 running thereon. The subscriber application 145 is an example of a client application. The subscriber application 145 enables the SDPS 125 to interface with the ASM 135 for enabling interaction therebetween. In this manner, a subscriber having access to the SDPS 125 may access subscriber services facilitated by the ASM 135.

Figure 2:
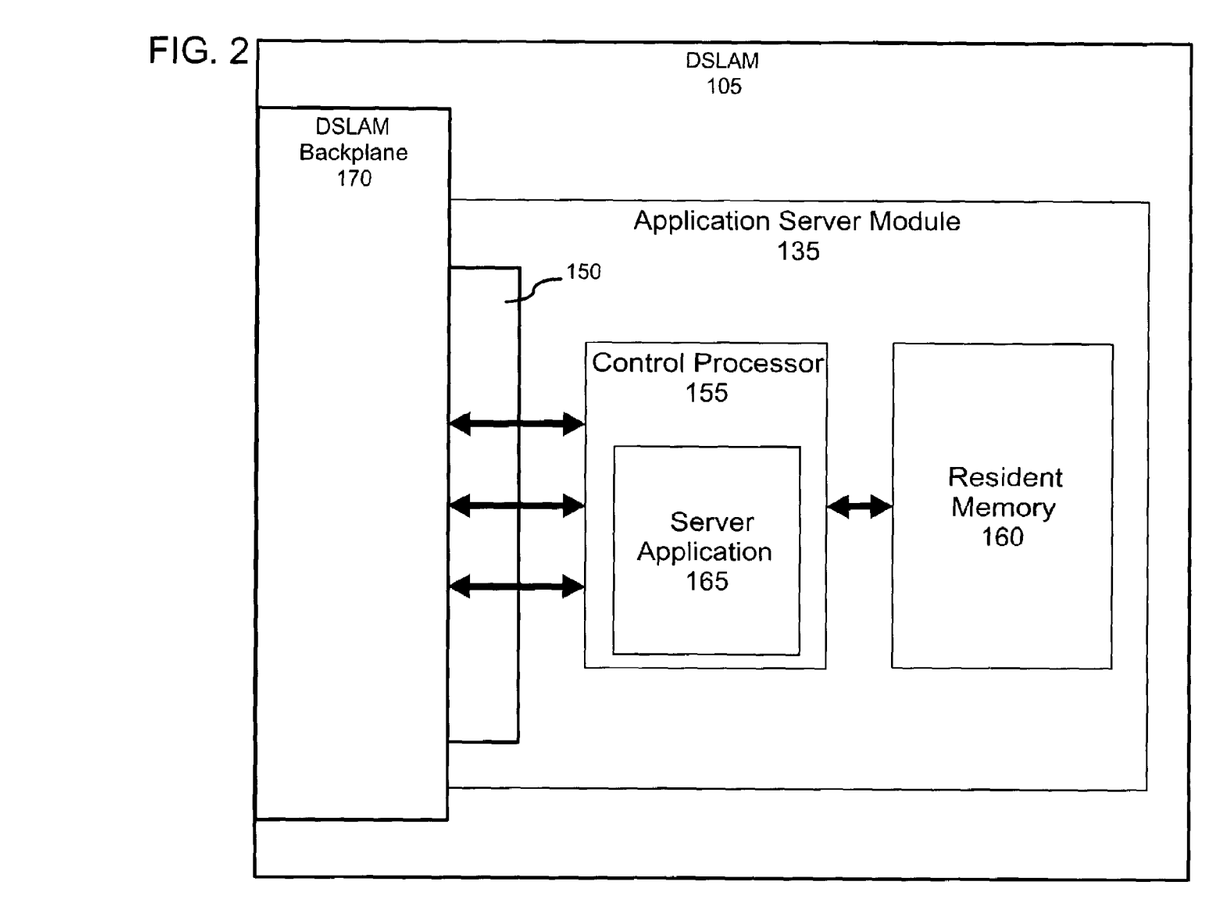
FIG. 2 is a block diagram depicting an embodiment of the Application server module depicted in FIG. 1.

As depicted in FIG. 2, the ASM 135 is includes a backplane connector 150, a control processor 155 and resident memory 160. The control processor 155 is connected to the backplane connector 150 and to the resident memory 160. The control processor 155 includes a server application 165 running thereon. The server application 165 may reside on the control processor 155, be accessed remotely (e.g., from the resident memory) or be accessed via a combination of resident and external memory. The ASM 135 is connected to a DSLAM backplane 170 via the backplane connector 150 of the ASM 135. Various interfaces are facilitated via ASM 135. Examples of such various interfaces include an interface between the ASM 135 and other application servers (i.e. servers), an interface between the ASM 135 and the SDPS 125, and an interface to other functional modules (i.e. billing, storage, etc).

Figure 3:
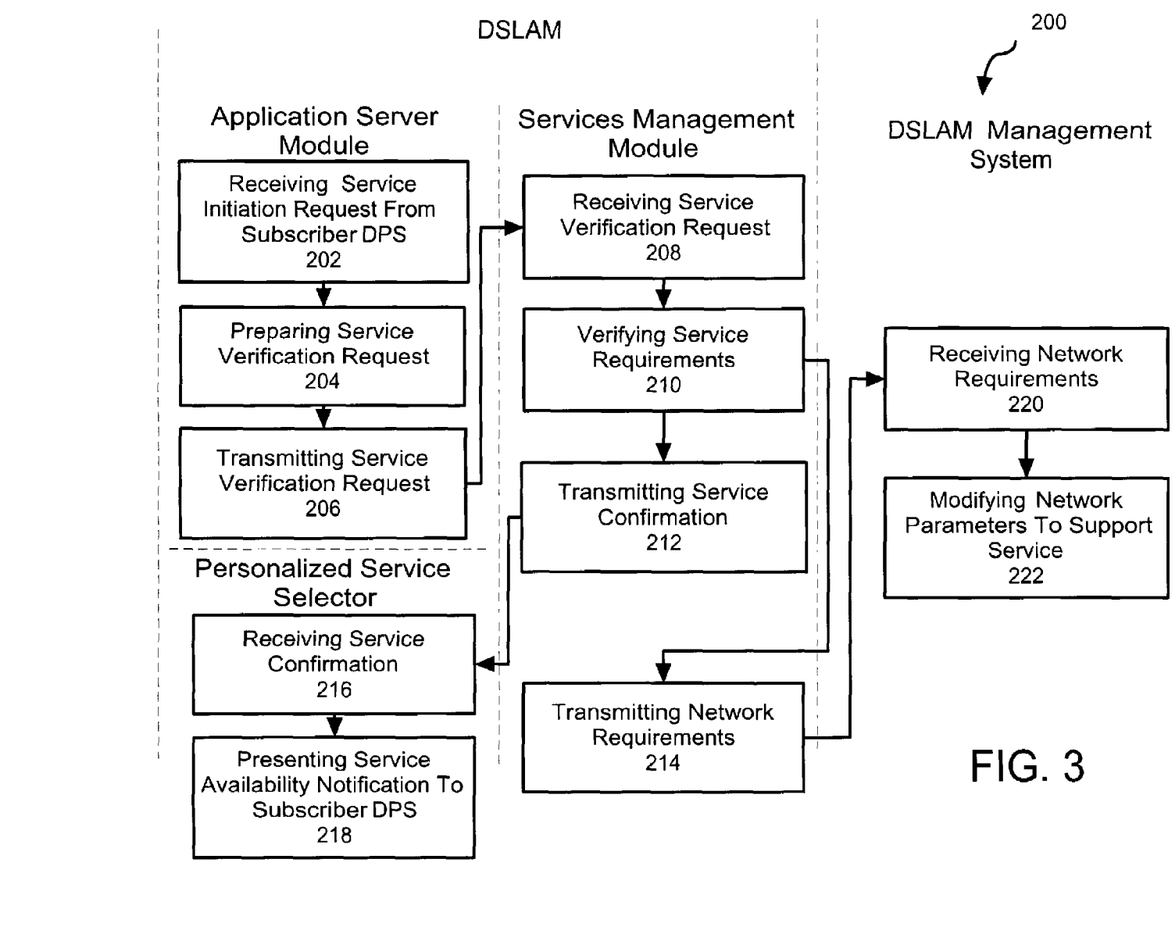
FIG. 3 is a flow diagram view depicting an embodiment of a method for facilitating DSLAM-hosted subscriber services management in accordance with the disclosures made herein.

FIG. 3 depicts an embodiment of a method 200 for facilitating DSLAM-hosted subscriber services management in accordance with the disclosures made herein. The method 200 begins at an operation 202 for receiving a service initiation request transmitted from a subscriber data processing system for reception by an application server module of the DSLAM. After receiving the service initiation request, an operation 204 is performed by the application server module for preparing a service verification request. In response to preparing the service verification request, an operation 206 is performed for transmitting the service verification request from the application server module for reception by a services management module of the DSLAM.

After the services management module performs an operation 208 for receiving the service verification request, the services management module performs an operation 210 for verifying the service requirements. Examples of service requirements include access rights of a subscriber, content blocks associated with a subscriber, network bandwidth capabilities of a connection mode, an available amount of billing credits and other application requirements that at least partially the determine whether a subscriber is able and/or capable of accessing a particular subscriber service. In response to the service requirements being successfully verified, the services management module performs an operation 212 for transmitting a service confirmation for reception by a service selector module and performs an operation 214 for transmitting a network requirements for reception by the DSLAM management system.

The service confirmation may include acknowledgement that access rights have been successfully verified, that the subscriber has a confirmed amount of billing credits remaining, that a service will be performing at a particular level of optimum performance, etc. The network requirement profile includes information upon which modifications to network parameters may be based. For example, such information in the network requirement profile may include a bandwidth requirement, a quality of service requirement, a bandwidth limit requirement and the like.

Still referring to FIG. 3, the service selector module performs an operation 216 for receiving the service confirmation in response to the services management module transmitting the service confirmation. After the service selector module received the service confirmation, the service selector module performs an operation 218 for presenting a service availability notification to the subscriber data processing system. The content of the service availability notification includes information that is included in the service confirmation and/or derivatives thereof. Displaying the availability notification via a user interface of a subscriber application is an example of presenting the services availability notification.

The DSLAM performs an operation 220 for receiving the network requirements in response to the services management module transmitting the network requirements. After the DSLAM management system receives the network requirements, the DSLAM management system performs an operation 222 for modifying any applicable/necessary network parameters in accordance with the network requirements. Examples of modifying applicable network parameters include modifying a network parameter associated with a bandwidth requirement, modifying a network parameter associated with a quality of service requirement and/or modifying one or more other network parameters associated with a corresponding network requirement.

As depicted in FIG. 3, various operations of the method 200 are associated with a particular functional component of a DSLAM as disclosed herein. However, in another embodiment of the disclosures made herein (not shown), at least a portion of the various operations of the method 200 are associated with a different functional component of the DSLAM than depicted in FIG. 3. In yet another embodiment of the disclosures made herein (not shown), all of the various operations are performed by either an application server module of a DSLAM or a services management module of the same DSLAM.

As DSL subscribers are offered video content over their broadband connection, DSLAMs, as the last network-provided data processing element, will be more capable of delivering video by having video server functionality (e.g. multicast, stream processing, digital rights management [DRM]) in the DSLAM. Via such an approach, video functionality can be closely integrated with the DSLAM's ATM and IP-layer capabilities for delivering video in an effective and efficient manner. Accordingly, providing integrated video services functionality within the DSLAM is advantageous.

Referring back to FIG. 1, one embodiment of the ASM 135 depicted in FIG. 1 is a video services module (VSM). The VSM is capable of performing a broad array of video services functionality. Examples of such video services functionality includes delivering an electronic program guide (EPG) to subscribers, facilitating conditional access control to video data streams, facilitating unicasting and multicasting for streaming and/or downloading of video files and facilitating messaging between the SMM 130 and the VSM with respect to video service events. Unlike conventional video servers, the VSM disclosed herein is integrated with certain Layer 2 and 3 capabilities of the DSLAM 105.

By providing such a VSM in the DSLAM 105, issues associated with conventional video services and servers are resolved. One issue that is resolved is processing bottlenecks resulting previously from centralized service/subscriber management devices (i.e., at an upstream centralized network node relative to the DSLAM 105) that attempt to process video data streams. Another issue that is resolved is inefficient and costly dedicated video servers that do not have a level of integration with the DSLAM 105, thereby taking advantage of certain DSLAM processing capabilities at the edge of the system network 110. Yet another issue that is resolved is scalability problems resulting from limited low-level integration with the DSLAM in order to take advantage of processing video service in the access network. Still another issue that is resolved is excessive network bandwidth requirements for delivering video content. Bandwidth requirements are resolved as a result of distributing video processing burden throughout the access network across a plurality of DSLAMs, rather than centralizing the processing (limiting scalability, and service usage rate) and requiring massive transport bandwidth (e.g. upgrade from DS-3 to OC-12). It is contemplated herein that such issues may be relevant to other type of application servers besides a video services module.

In one specific embodiment of the VSM, the VSM will enable video download service, retrieving movies from a device that is locally connected to the DSLAM. DSL endpoints (e.g., subscriber data processing systems) will request to receive the movies by signalling the VSM. The VSM will gather requests (e.g., from a plurality of subscribers), initiate multicast download sequences and signal back to the endpoint devices. The SMM 130 performs licensing and resource checks and, after verification, allows the video multicast application to run. The SMM 130 interfaces with the PSS 140, notifying the PSS 140 about whether the video multicast application is available to particular users or not. Further, the SMM 130 can make requests to the DSLAM management system 120 for requesting that the DSLAM management system modify parameters of the access network (e.g. QoS, Bandwidth) in order to accommodate the needs of the VSM.

Figure 4:
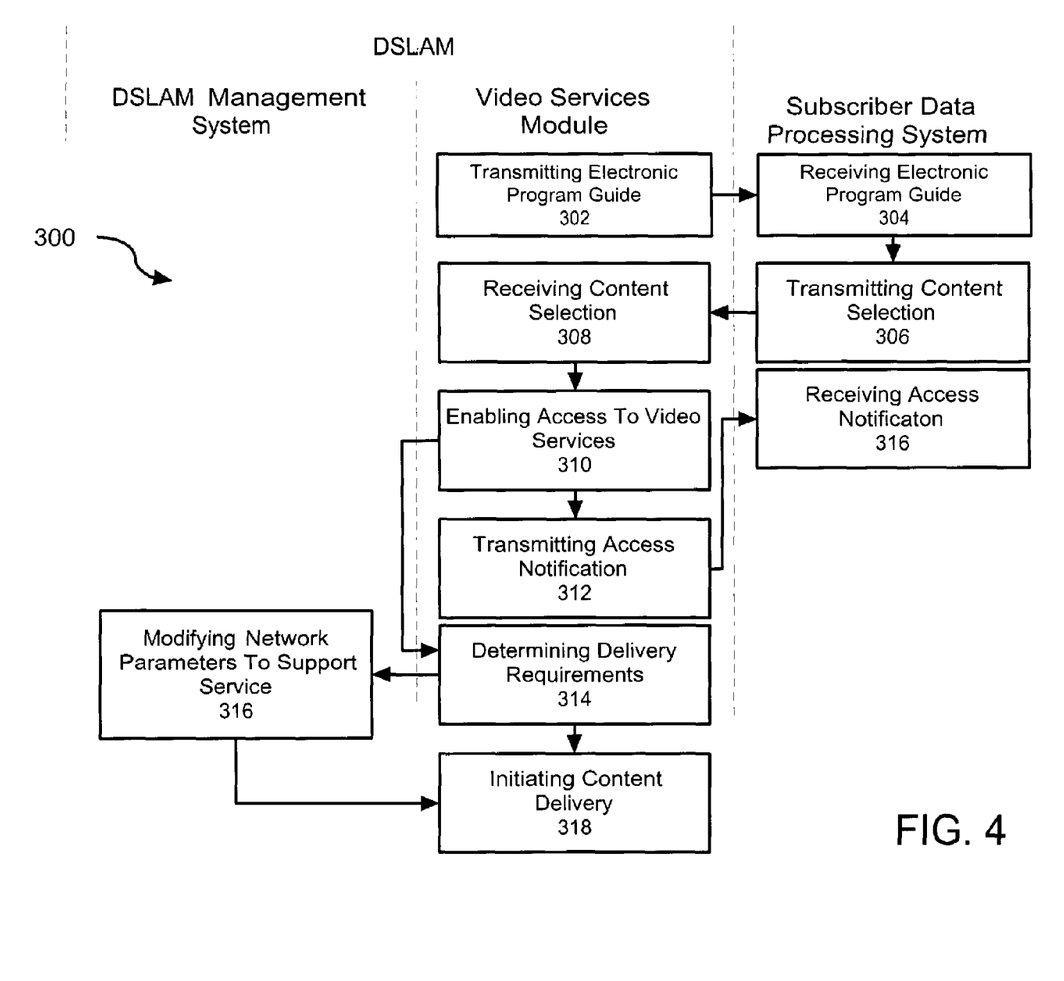
FIG. 4 is a flow diagram view depicting an embodiment of a method for facilitating DSLAM-hosted video services in accordance with the disclosures made herein.

FIG. 4 depicts an embodiment of a method 300 for facilitating video services via a VSM mounted in a DSLAM (i.e., DSLAM-hosted video services). After the VSM performs an operation 302 for transmitting an Electronic Program Guide (EPG) for reception by a subscriber data processing system, the subscriber data processing system performs an operation 304 for receiving the EPG. After receiving the EPG, an operation 306 is performed by the subscriber data processing system for transmitting a content selection made by a subscriber for reception by the VSM.

In response to the VSM performing an operation 308 for receiving the content selection, the VSM performs an operation 310 for enabling access to video services facilitated by the VSM. Enabling such access may include verifying authorization to receive the requested content, verifying billing information of the subscriber, checking for content blocks, etc. In response to enabling access to the video services facilitated by the VSM, the VSM performs an operation 312 for transmitting an access notification for reception by the subscriber data processing system and an operation 314 for determining delivery requirements for the selected content. Examples of information in the access notification include information relating to billing, information relating to delivery of the content, information relating to access authorization (e.g., a reason for access denial), and other useful information. Examples of the delivery requirements include requirements relating to type of delivery mechanism (unicast, multicast, streaming, etc), requirements relating to required connection bandwidth, requirements relating to content delivery schedule information, requirements relating to DSLAM aggregate traffic, requirements relating to grouping of other user's requests and the like.

After transmitting the access notification, the subscriber data processing system performs an operation 316 for receiving the access notification. After determining the delivery requirements, the DSLAM management system facilitates modifying network parameters as necessary and in accordance with the delivery requirements. It is contemplated and disclosed herein that a services management module as disclosed herein may participate in modifying the network parameters. For example, the services management module may provide required information to the DSLAM management system in response to receiving associated information from VSM. After determining the delivery parameters and modifying any applicable network parameters, the VSM performs an operation 318 for initiating delivery of the selected content.

As depicted in FIG. 4, various operations of the method 300 are associated with a particular functional component of a DSLAM as disclosed herein. However, in another embodiment of the disclosures made herein (not shown), at least a portion of the various operations of the method 300 are associated with a different functional component of the DSLAM than depicted in FIG. 4. In yet another embodiment of the disclosures made herein (not shown), all of the various operations are performed by either the VSM of a DSLAM or a services management module of the same DSLAM.

Referring back to FIG. 1, another embodiment of the ASM 135 depicted in FIG. 1 is a gaming services module (GSM). The GSM is capable of performing a broad array of gaming services functionality. Examples of such gaming services functionality includes delivering an electronic game guide (EGG) to subscribers, facilitating conditional access control to gaming content, facilitating individual or group play of games and facilitating messaging between the SMM 130 and the GSM with respect to gaming service events.

Unlike conventional gaming servers, the GSM disclosed herein is integrated with certain Layer 2 and 3 capabilities of the DSLAM 105. Accordingly, gaming services as disclosed herein are DSLAM-hosted.

By providing such a GSM in the DSLAM 105, certain issues associated with conventional gaming servers and services are resolved. On issue that is resolved is the requirement for expensive, leased bandwidth to distribute the gaming content to the central office is eliminated by placing the GSM in the DSLAM rather than at a service provider's point-of-presence (POP). Another issue that is resolved is the necessity that the GSM conform to certain industry standards is lessened as a result of placing the GSM in the DSLAM, thus reducing the cost of deploying the GSM. Still another issue that is resolved is that the need for a central office (CO) located GSM is eliminated, thus eliminating the associated network bandwidth previously required to connect with the DSLAM. Finally, by mounting the GSM in the DSLAM rather than at the central office, physical space in the central office need not be utilized. It is contemplated herein that such issues may be relevant to other type of application servers besides a gaming services module.

In one embodiment, the GSM is designed to fit on a blade in the DSLAM, thus eliminating costly network bandwidth usage and additional DSLAM real estate. All subscribers served or subtended from the DSLAM will have access to the GSM. Other DSLAM's will be able to communicate with the gaming server over the CO network. Depending on size and complexity, the GSM may offload functionality to other modules of the DSLAM. For simplicity, the gaming server card may only provide the content to the subscriber. For example, subscriber management functionality may be performed by another module of the DSLAM (e.g., the SMM). Similar types of structure and functionality for other types of application services modules are contemplated herein. In one specific embodiment of the GSM, the subscriber runs an application or accesses a web page on their local PC or STB in order to play a game. The application or web page allows the subscriber to search for the nearest DSLAM-hosted GSM and to connect to the DSLAM-hosted GSM. The GSM allows the user to play multi-player games with other users. The GSM acts as a separate network element and can therefore access other external and DSLAM servers. The GSM is able to host thousands of subscribers simultaneously. The GSM has the ability to use local ancillary modules of the DSLAM (e.g., a storage module, a billing module, etc) for facilitating gaming services.

Figure 5:
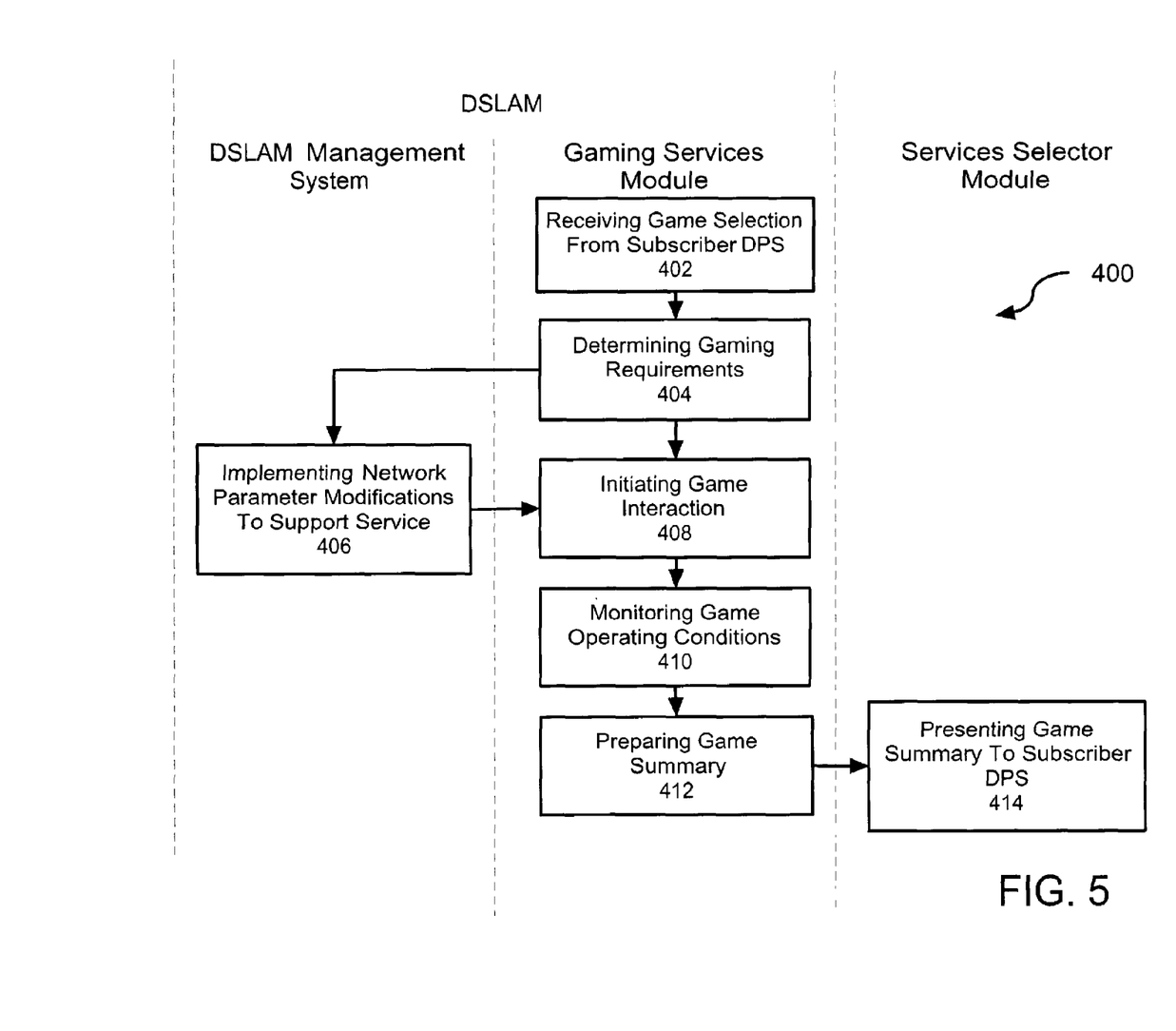
FIG. 5 is a flow diagram view depicting an embodiment of a method for facilitating DSLAM-hosted gaming services in accordance with the disclosures made herein.

FIG. 5 depicts an embodiment of a method 400 for facilitating gaming services via a GSM mounted a DSLAM (i.e. DSLAM-hosted gaming services). In response to the GSM performing an operation 402 for receiving a game selection transmitted from a subscriber data processing system (e.g., PC, set-top box, etc.) for reception by the GSM, an operation 404 is performed by the GSM for determining gaming requirements. Examples of gaming parameters include a parameter relating to skill level, a parameter relating to authorized subscribers, a parameter relating to competitors, a parameter relating to connection bandwidth requirements, a parameter relating to billing requirements, and the like. After determining the gaming parameters, an operation 406 is performed by the DSLAM management system for implementing network parameter modifications based at least partially on the gaming requirements.

An operation 408 is performed by the GSM for initiating gaming interaction after determining the gaming requirements and after modifying any necessary network parameters. An operation 410 is performed for monitoring game operating conditions. One objective of monitoring game operating conditions is to determine whether any network parameters need to be modified after game interaction is initiated. At some point after the game interaction is initiated (e.g., after the game interaction is terminated, between game segments, etc.), an operation 412 is performed by the GSM for preparing a game summary, followed by an operation 414 being performed by a services selector module for presenting the game summary to the subscriber data processing system. Examples of content of the game summary include information relating to information relating to a remaining amount of billing credits, information relating to an outcome of the game/game segment, information relating to a revised skill level of the subscriber, and the like.

As depicted in FIG. 5, various operations of the method 400 are associated with a particular functional component of a DSLAM as disclosed herein. However, in another embodiment of the disclosures made herein (not shown), at least a portion of the various operations of the method 400 are associated with a different functional component of the DSLAM than depicted in FIG. 5. In yet another embodiment of the disclosures made herein (not shown), all of the various operations are performed by either the GSM of a DSLAM or a services management module of the same DSLAM.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for providing subscriber services management in an apparatus providing Digital Subscriber Line Access Multiplexing (DSLAM) functionality over a subscriber line to a subscriber, comprising:

receiving a service initiation request at an Application Server Module (ASM) resident on the apparatus, wherein the service initiation request seeks access for a subscriber to a subscriber service facilitated by the ASM;

monitoring a bandwidth of the subscriber line; and enabling the subscriber to access the subscriber service provided by the ASM including adapting the subscriber service to be provided over the subscriber line to the subscriber at an optimum level of performance base on other current bandwidth requirements of the subscriber.

2. The method of claim 1 wherein:

receiving the service initiation request includes receiving subscriber identification of the subscriber; and verifying said subscriber identification for confirming that the subscriber is authorized to access the subscriber service facilitated by the ASM.

3. The method of claim 1, further comprising:
determining network resource requirements for enabling operation of the subscriber service facilitated by the ASM; and
modifying at least one network resource parameter in accordance with said network resource requirements.

4. The method of claim 3 wherein determining said network resource requirements includes assessing at least one of a network connection between the apparatus and a subscriber data processing system and a connection between the apparatus and an upstream network node.

5. The method of claim 3 wherein modifying said at least one network resource parameter includes modifying at least one of a parameter affecting Quality of Service and a parameter affecting connection bandwidth.

6. The apparatus of claim 1, further comprising:
determining network resource requirements for enabling operation of the subscriber service facilitated by the ASM
determining modification of at least one network resource parameter in accordance with said network resource requirements; and
transmitting a message including information for at least partially dictating said modification of said at least one network resource parameter to a system capable of implementing said modification of said at least one network resource parameter.

7. The method of claim 1 wherein enabling the subscriber to access the subscriber service facilitated by the ASM includes transmitting a service availability notification for reception by a data processing system accessible by the subscriber.

8. The method of claim 7 wherein transmitting the service availability notification is performed by a Service Selector Module (SSM) of the apparatus.

9. The method of claim 7 wherein transmitting the service availability notification includes
transmitting a first message from the SMM for reception by a Service Selector Module (SSM); and
transmitting a second message from the SSM for reception by a data processing system accessible by the subscriber after the SSM received the first message;
wherein content of the second message is derived from content of the first message.

10. The method of claim 1 wherein:
enabling the subscriber to access the subscriber service facilitated by the ASM includes:
initiating an activity in which the subscriber is a participant; and
monitoring participation of the subscriber in the activity; and
the ASM facilitates initiating and monitoring.

11. The method of claim 10 wherein:
enabling the subscriber to access the subscriber service facilitated by the ASM further includes billing the subscriber based at least partially on said participation; and
the ASM facilitates billing.

12. The method of claim 10 wherein:
enabling the subscriber to access the subscriber service facilitated by the ASM further includes
preparing a participation summary; and
transmitting the participation summary for reception by a data processing system accessible by the subscriber; and
the ASM facilitates billing.

13. An apparatus capable of providing Digital Subscriber Line Access Multiplexing (DSLAM) functionality and coupled to a subscriber data processing system by a Digital Subscriber Line, comprising;
an Application Server Module (ASM) enabling an available subscriber service for a subscriber;
a Services Management Module (SMM) coupled to the ASM, wherein the SMM enables at least one of managing operation functions of the ASM, managing system resources for enabling efficient operation of the ASM and enabling personalized services information to be delivered to the subscriber; and
a data processor program enabling at least one of the ASM and the SSM to facilitate:
receiving a service initiation request at the ASM, wherein the service initiation request seeks access for a subscriber to a subscriber service facilitated by the ASM;
monitoring a bandwidth of the subscriber line; and
enabling the subscriber to access the subscriber service facilitated by the ASM including adapting the subscriber service to be provided over the subscriber line to the subscriber at an optimum level of performance base on other current bandwidth requirements of the subscriber.

14. The apparatus of claim 13 wherein enabling at least one of the ASM and the SSM to facilitate:
receiving the service initiation request includes enabling at least one of the ASM and the SSM to facilitate receiving subscriber identification of the subscriber; and
enabling at least one of the ASM and the SSM to facilitate verifying said subscriber identification for confirming that the subscriber is authorized to access the subscriber service facilitated by the ASM.

15. The apparatus of claim 13 wherein the data processor program is further capable of enabling at least one of the ASM and the SSM to facilitate:
determining network resource requirements for enabling operation of the subscriber service facilitated by the ASM; and
modifying at least one network resource parameter in accordance with said network resource requirements.

16. The apparatus of claim 15 wherein enabling at least one of the ASM and the SSM to facilitate determining said network resource requirements includes enabling at least one of the ASM and the SSM to facilitate assessing at least one of a network connection between the apparatus and a subscriber data processing system and a connection between the apparatus and an upstream network node.

17. The apparatus of claim 15 wherein enabling at least one of the ASM and the SSM to facilitate modifying said at least one network resource parameter includes enabling at least one of the ASM and the SSM to facilitate modifying at least one of a parameter affecting Quality of Service and a parameter affecting connection bandwidth.

18. The apparatus of claim 13 wherein the data processor program is further capable of enabling at least one of the ASM and the SSM to facilitate:
determining network resource requirements for enabling operation of the subscriber service facilitated by the ASM determining modification of at least one network resource parameter in accordance with said network resource requirements; and transmitting a message including information for at least partially dictating said modification of said at least one network resource parameter to a system capable of implementing said modification of said at least one network resource parameter.

19. The apparatus of claim 13 wherein enabling at least one of the ASM and the SSM to facilitate enabling the subscriber to access the subscriber service facilitated by the ASM includes enabling at least one of the ASM and the SSM to facilitate transmitting a service availability notification for reception by a data processing system accessible by the subscriber.

20. The apparatus of claim 13 wherein enabling at least one of the ASM and the SSM to facilitate enabling the subscriber to access the subscriber service facilitated by the ASM includes enabling the ASM to facilitate:

initiating an activity in which the subscriber is a participant; and monitoring participation of the subscriber in the activity.

21. The apparatus of claim 13 wherein enabling at least one of the ASM and the SSM to facilitate enabling the subscriber to access the subscriber service facilitated by the ASM further includes enabling the ASM to facilitate:

billing the subscriber based at least partially on said participation.

22. The apparatus of claim 13 wherein enabling at least one of the ASM and the SSM to facilitate enabling the subscriber to access the subscriber service facilitated by the ASM further includes enabling the ASM to facilitate:

preparing a participation summary; and transmitting the participation summary for reception by a data processing system accessible by the subscriber.

* * * * *